(12) United States Patent
Payne et al.

(10) Patent No.: US 8,431,238 B2
(45) Date of Patent: Apr. 30, 2013

(54) PROTECTIVE COATING FOR METALLIC SEALS

(75) Inventors: Jeremy M. Payne, New Haven, CT (US); James E. Beach, North Haven, CT (US); Amitava Datta, East Greenwich, RI (US); Kenneth W. Cornett, Ivoryton, CT (US); Dominick G. More, Middletown, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 429 days.

(21) Appl. No.: 12/388,792

(22) Filed: Feb. 19, 2009

(65) Prior Publication Data

US 2009/0208775 A1     Aug. 20, 2009

Related U.S. Application Data

(60) Provisional application No. 61/029,611, filed on Feb. 19, 2008.

(51) Int. Cl.
| | |
|---|---|
| *B32B 15/04* | (2006.01) |
| *B32B 15/01* | (2006.01) |
| *C03C 27/00* | (2006.01) |
| *C23C 22/24* | (2006.01) |
| *B05D 1/04* | (2006.01) |
| *H05C 1/00* | (2006.01) |

(52) U.S. Cl.
USPC ........... 428/627; 428/617; 428/633; 428/628; 428/668

(58) Field of Classification Search .......... 428/615–619, 428/629–633; 427/215–217, 457, 472–474
See application file for complete search history.

(56) References Cited

U.S. PATENT DOCUMENTS

| | | | |
|---|---|---|---|
| 4,275,124 A | * | 6/1981 | McComas et al. ............ 428/564 |
| 4,789,441 A | * | 12/1988 | Foster et al. .................... 205/50 |
| 4,810,334 A | | 3/1989 | Honey et al. |
| 5,078,837 A | | 1/1992 | Descamp et al. |
| 5,385,760 A | | 1/1995 | Schassberger et al. |
| 5,833,829 A | | 11/1998 | Foster |
| 5,935,407 A | | 8/1999 | Nenov et al. |

(Continued)

FOREIGN PATENT DOCUMENTS

| | | |
|---|---|---|
| EP | 0 484 115 A1 | 6/1992 |
| EP | 0 845 547 | 6/1998 |

OTHER PUBLICATIONS

Extended European Search Report for corresponding European Patent Application No. 09250433.1 dated Jun. 8, 2010.

(Continued)

*Primary Examiner* — Jennifer McNeil
*Assistant Examiner* — Xiaobei Wang
(74) *Attorney, Agent, or Firm* — Renner, Otto, Boisselle & Sklar, LLP

(57) ABSTRACT

A composition and process for forming an electrodeposited coating comprising a co-deposit of a metal and MCrAlY particles. The composition includes a metal and a MCrAlY particles, and the electrodeposited coating comprises a metal matrix and MCrAlY particles dispersed in the matrix. In one aspect, a coating is provided that exhibits excellent oxidation resistance and tribological characteristics at high temperatures, including up to at least about 1350° F. A high temperature coating may comprise a nickel/cobalt alloy matrix comprising MCrAlY particles and chromium carbide particles dispersed in the nickel/cobalt matrix.

11 Claims, 1 Drawing Sheet

U.S. PATENT DOCUMENTS

| | | |
|---|---|---|
| 6,218,029 B1 * | 4/2001 | Rickerby .................. 428/615 |
| 6,376,015 B1 * | 4/2002 | Rickerby .................. 427/250 |
| 6,695,960 B1 | 2/2004 | Bacos et al. |
| 6,887,589 B2 * | 5/2005 | Darolia et al. ............ 428/633 |
| 2004/0208749 A1 | 10/2004 | Torigoe et al. |
| 2004/0213919 A1 * | 10/2004 | Fried ...................... 427/455 |
| 2004/0241833 A1 | 12/2004 | Girard et al. |
| 2005/0145501 A1 | 7/2005 | Bendik et al. |
| 2006/0127590 A1 | 6/2006 | Dietz et al. |
| 2008/0220209 A1 * | 9/2008 | Taylor et al. ............. 428/134 |

OTHER PUBLICATIONS

Tribomet® MCrAlY Coatings, Praxair Surface Technologies, 3 pages.

Tribomet® T104C and T104CS Wear Control Coatings, Praxair Surfaces Technologies, 4 pages.

\* cited by examiner

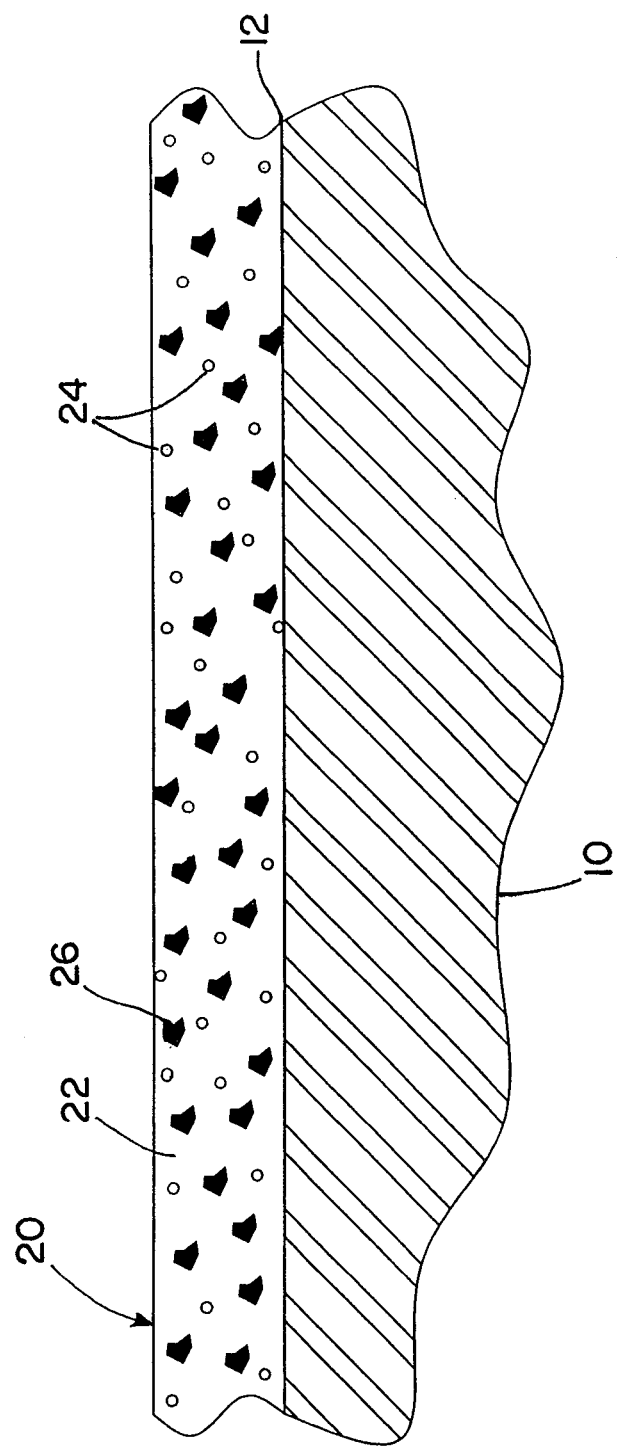

PROTECTIVE COATING FOR METALLIC SEALS

RELATED APPLICATION

This application claims priority under 35 U.S.C. §119 (e) to U.S. Provisional Patent Application No. 61/029,611 filed on Feb. 19, 2008. The entire disclosure of this provisional application is hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

FIELD

The invention provides a composition for electrodepositing a coating onto a surface of a substrate. The invention further provides a composition for electrodepositing a coating having oxidation resistance and good tribological characteristics even in high temperature operating environments.

BACKGROUND

Components in various applications such as in gas turbines, jet engines, diesel engines, cars, race cars, and the like may be exposed to high temperature operating conditions. For example, various parts of engines may be exposed to temperatures of 1000° F. or higher. As such, parts (typically metal parts) may be provided with a coating layer to provide a desired level of protection when exposed to these high temperatures. Coatings may be applied by various methods, including thermal spray techniques and electrodeposition techniques.

SUMMARY

The present invention provides compositions for electrodepositing a coating onto a substrate that contain a metal matrix having MCrAlY particles dispersed therein. The compositions with MCrAlY particles provide a way to introduce elements such as Al and Y into a coating, which may provide a coating with improved corrosion and/or oxidation resistance.

In one embodiment, the invention provides an electroplating bath comprising an aqueous phase comprising metal ions; and MCrAlY particles suspended in the aqueous phase, the MCrAlY particles being an alloy comprising (i) chromium, (ii) aluminum, (iii) yttrium, and (iv) a metal (M) chosen from nickel, cobalt, iron, or a combination of two or more thereof.

The plating bath may contain metal ions chosen from nickel, cobalt, tin, zinc, copper, iron, tungsten, or a mixture of two or more thereof.

The plating bath may comprise from about 30 to about 70 g/L of MCrAlY particles.

The bath may further comprise other particles, such as chromium carbide particles suspended in the bath.

The pH of the bath may be acidic. In an embodiment, the bath may have a pH of from about 1.5 to about 5.

The present invention also provides a method for depositing a coating onto a substrate and a substrate coated thereby. The coating may be applied to a substrate by immersing the substrate in the bath comprising the MCrAlY particles and electrodepositing a metal coating onto the substrate. The metal coating comprises (i) a matrix phase comprising a metal or metal alloy, and (ii) MCrAlY particles dispersed in the matrix phase.

In another embodiment, the present invention provides a composition for electrodepositing a coating onto a substrate that provides high temperature performance. The present invention provides, in one aspect, an aqueous plating bath for the electrodeposition of a nickel/cobalt alloy deposit on a substrate comprising: nickel ions; cobalt ions; particles of MCrAlY suspended in the bath, wherein M is chosen from cobalt, iron, nickel, or a combination of two or more thereof; and particles of chromium carbide ($Cr_3C_2$) suspended in the bath.

The nickel/cobalt bath for forming high temperature performance coatings may comprise from about 30 to about 70 g/L of MCrAlY particles and from about 50 to about 140 g/L of chromium carbide particles. The bath may contain from about 5 to about 35 g/L of cobalt (as metal) and from about 45 to about 90 g/L of nickel (as metal); the bath may contain from about 7 to about 25 g/L of cobalt as metal and from about 55 to about 80 g/L of nickel (as metal); the bath may contain from about 10 to about 15 g/L of cobalt (as metal) and from about 60 to about 70 g/L of nickel as metal.

The pH of the nickel/cobalt bath may be from about 1.5 to about 5.

In one embodiment, the nickel/cobalt bath may comprise from about 350 to about 400 g/L nickel sulfamate (Ni$(SO_3NH_2)_2$.$4H_2O$), from about 60 to about 100 g/L cobalt sulfamate) (Ni($SO_3NH_2$)2.$4H_2O$), from about 50 to about 115 g/L $Cr_3C_2$ particles, from about 40 to about 60 g/L MCrAlY particles, from about 30 to about 40 g/L boric acid, and have a pH of about 1.5 to about 3.

The present invention provides an article comprising a coating layer formed from the nickel/cobalt plating bath. The coating may be formed by electrodeposition techniques. The coating layer comprises a matrix phase comprising nickel and cobalt and having MCrAlY and chromium carbide particles dispersed in the matrix phase. The matrix phase may comprise (on a weight percent basis or a mole percent basis), in one embodiment from about 20% to about 80% nickel and from about 20% to about 80% cobalt. In another embodiment, the matrix phase may comprise from about 30% to about 60% nickel and from about 40% to about 70% cobalt. In still another embodiment, the matrix phase may comprise about 50% nickel and about 50% cobalt. The coating may comprise from about 60 to about 80% by volume of the matrix phase, from about 10 to about 20 volume percent of MCrAlY particles, and from about 10 to about 20 volume percent of chromium carbide particles. Nickel/cobalt coatings with MCrAlY and chromium carbide particles co-deposited with and dispersed in the nickel/cobalt matrix are found to exhibit good oxidation resistance and tribological characteristics at temperatures of at least about 1000° F. and even up to 1500° F. These coatings may also provide good protection at temperatures up to 1600° F. in environments having lower oxygen concentrations.

In one aspect, upon exposure to temperatures of from about 1000° F. to about 1600° F. the nickel/cobalt coating having the MCrAlY particles and chromium carbide particles dispersed therein forms an outer, lubricious layer overlying an oxidation resistant layer, the lubricious layer comprising cobalt oxide and chromium oxide, and the oxidation resistant layer comprising aluminum oxide.

These and other features of the invention are fully described and particularly pointed out in the claims. The following description and annexed drawings set forth in detail certain illustrative embodiments, these embodiments being indicative of but a few of the various ways in which the principles may be employed.

DRAWINGS

FIG. 1 is a schematic cross-section of a substrate having a coating layer in accordance with one aspect of the present invention.

DESCRIPTION

The present invention provides compositions, methods of depositing a coating layer onto a substrate from such compositions, and articles incorporating such coatings. The invention provides a composition for preparing an electrodeposited coating comprising a metal matrix having particles dispersed in the metal matrix.

All ranges and ratios discussed herein can and do also describe all subranges and subratios therein for all purposes and that all such subranges and subratios also form part and parcel of this invention. Any listed range or ratio may be recognized as sufficiently describing and enabling the same range or ratio being broken down into at least equal halves, thirds, quarters, fifths, tenths, etc. As a non-limiting example, each range or ratio discussed herein can be readily broken down into a lower third, middle third and upper third, etc.

The electroplating composition, which may also be referred to as a plating bath, comprises (i) one or more metals (in solution), and (ii) MCrAlY particles suspended in the bath. The bath may be provided as an aqueous solution. In this sense, the bath contains water.

The type of metal is not particularly limited and may be selected from any suitable metal as may be deposited via electrodeposition. The bath may contain a plurality of metals to form a metal alloy matrix coating. The metal(s) may be provided in any suitable form such as, for example, in an ionic state. The metal is obtained by adding a suitable source of the metal such as, for example, from a metal salt that is soluble in the aqueous solution. In one embodiment, the bath may contain a metal chosen from nickel, cobalt, tin, zinc, copper, iron, tungsten, or a mixture of two or more thereof. Nickel may be provided, for example, by nickel sulfate, nickel chloride, nickel sulfamate, mixtures of two or more thereof, and the like. Cobalt may be provided in the bath, for example, by cobalt sulfate, cobalt chloride, cobalt sulfamate, mixtures of two or more thereof, and the like.

The MCrAlY particles are alloy particles comprising (i) chromium (Cr), (ii) aluminum (Al), (iii) yttrium (Y), and (iv) a metal (M) chosen from nickel (Ni), cobalt (Co), iron (Fe) or a combination of two or more thereof. The MCrAlY particles may optionally include other metals such as silicon (Si), titanium (Ti), hafnium (Hf), tantalum (Ta), niobium (Nb), manganese (Mn), platinum (Pt), and rare earth elements. The particles may also contain non-metal components such as, for example, phosphorous (P), sulfur (S), nitrogen (N), selenium (Se), and the like. Applicants have found that by providing MCrAlY particles, a coating may be provided with improved corrosion and oxidation resistance. Without being bound by any particular theory, the incorporation of MCrAlY particles provides a way to introduce Al and Y into the coating, which may otherwise be difficult if trying to plate out such elements from solution. Al, Y, and chromium are believed to provide the coating with corrosion and oxidation resistance.

The amounts of the various components in the MCrAlY particles is not particularly limited. In one embodiment, the particles may contain, for example, from about 0.2 to about 5% yttrium, from about 5 to about 20% aluminum, from about 10 to about 60% chromium, from about 0 to about 80% iron, from about 0 to about 80% nickel, and from about 0 to about 80% cobalt. Suitable MCrAlY particles include those available from Praxair including a MCrAlY powder sold under the designation CO-210-38, and MCrAlY particles available from Sulzer Metco including, for example, Sulzer Metco 4451 and/or AMDRY® 9951.

In one aspect, the present invention provides a plating bath composition for electrodepositing a nickel/cobalt alloy coating that is suitable for use in high temperature operating conditions. Such compositions may also be referred to herein as high temperature nickel/cobalt compositions (or baths), and coatings or deposits formed from such compositions as baths may be referred to as high temperature nickel/cobalt coatings (or deposits). The nickel/cobalt plating bath may be provided as an aqueous solution comprising nickel and cobalt in the solution, MCrAlY particles suspended in the solution, and chromium carbide ($Cr_3C_2$) particles suspended in the solution.

The nickel/cobalt plating bath composition for forming high temperature performance deposits may comprise nickel and cobalt metal in any suitable form. Typically, the nickel and cobalt are dissolved in the aqueous bath, and may be provided in the bath in their ionic forms as derived from a metal salt. The high temperature nickel/cobalt bath may contain from about 5 g/L to about 35 g/L of cobalt (as metal), in another embodiment, from about 7 g/L to about 25 g/L of cobalt (as metal), and in another embodiment from about 10 to about 15 g/L of cobalt (as metal). The bath may contain from about 45 to about 90 g/L of nickel (as metal), from about 55 to about 80 g/L of nickel (as metal), and in another embodiment, from about 60 to about 70 g/L of nickel (as metal). As described above, the nickel and/or cobalt may be provided in the bath as a metal salt, e.g., cobalt sulfate ($CoSO_4.6H_2O$), cobalt chloride ($CoCl_2.6H_2O$), cobalt sulfamate, nickel sulfate ($NiSO_4.6H_2O$), nickel chloride ($NiCl_2.6H_2O$), nickel sulfamate ($Ni(SO_3NH_2)_2.4H_2O$), and the like.

The amount of the salt provided may vary depending on the desired concentration of the respective metal. In one embodiment, the nickel/cobalt bath may include from about 25 to about 65 g/L of cobalt sulfate, in another embodiment from about 35 to about 55 g/L of cobalt sulfate, and in another embodiment, from about 40 to about 50 g/L of cobalt sulfate. In one embodiment, the nickel/cobalt bath may include from about 270 to about 330 g/L of nickel sulfate, in another embodiment from about 285 to about 315 g/L of nickel sulfate, and in another embodiment, from about 295 to about 305 g/L of nickel sulfate. In one embodiment, the nickel/cobalt bath may be a sulfamate based bath, wherein the nickel is provided via nickel sulfamate, and the cobalt is provided via cobalt sulfamate. The bath may contain, for example, from about 350 to about 400 g/L of nickel sulfamate and from about 60 to about 100 g/L of cobalt sulfamate.

The bath, including the nickel/cobalt bath may include, for example, from about 30 to about 70 g/L of MCrAlY particles. In another embodiment, the bath may include from about 40 to about 60 g/L of MCrAlY particles, and in another embodiment the bath may include from about 45 to about 55 g/L of MCrAlY particles. In one embodiment, the MCrAlY particles may have an average particle size of about 4 μm or less; in another embodiment, the average particle size may be about 3 μm or less, and in another embodiment the MCrAlY particles may have an average particle size of about 2 μm or less. In one embodiment, the MCrAlY particles may have a particle size of about 5 μm or less.

The chromium carbide ($Cr_3C_2$) particles may be present in the bath, including the nickel/cobalt bath, in an amount of from about 50 g/L to about 140 g/L; in another embodiment from about from about 100 g/L to about 125 g/L, and in another embodiment, from about 105 to about 120 g/L. In one embodiment, the chromium carbide particles may have a particle size of about 1.6 µm or less.

The concentrations of the metal components, MCrAlY particles, chromium carbide particles, etc., in a plating bath in accordance with the present invention may be provided to provide a coating having a desired content of metal (or a desired metal ratio for an alloy coating) and desired particle content. For example, in one embodiment, a high temperature nickel/cobalt coating may be provided comprising from about 60 to about 80 volume percent of a nickel/cobalt metal matrix, from about 10 to about 20 volume percent of chromium carbide particles, and from about 10 to about 20 volume percent of MCrAlY particles, the chromium carbide and MCrAlY particles dispersed in the metal matrix. In one embodiment, the metal matrix may comprise from about 20% to about 80% nickel and from about 20% to about 80% cobalt. In another embodiment, the matrix phase may comprise from about 30% to about 60% nickel and from about 40% to about 70% cobalt. In another embodiment, the metal matrix of a high temperature nickel/cobalt coating may have from about 40% to about 55% nickel and from about 45% to about 60% cobalt. In still another embodiment, the matrix phase may comprise about 50% nickel and about 50% cobalt. The amount of the metal(s) in the metal matrix may refer to the concentration of the metal on a weight percent or a mole percent basis.

The plating bath may include other components including, for example, wetting agents, surfactants, buffers, brighteners, leveling agents, and the like, as desired for a particular purpose or intended use. The plating baths, including a nickel/cobalt plating bath, may include, for example, boric acid or other buffering agents to control the pH of the plating bath. In one embodiment, a nickel/cobalt plating bath may include from about 20 g/L to about 60 g/L of boric acid.

The pH of the plating baths may depend on the metal(s) being plated and may be acidic or basic. Nickel, cobalt, nickel/cobalt alloys, for example, tend to be provided as acidic solutions. The pH of the plating baths for plating nickel, cobalt, or nickel/cobalt alloys may be, for example, from about 1.5 to about 5.0. In one embodiment a nickel and/or cobalt based bath may have a pH of from about 2.0 to about 4.5. In another embodiment, the bath has a pH of from about 3.5 to about 4.0. During operation, the pH of the bath may tend to rise (become less acidic) and may need to be adjusted with acids such as hydrochloric acid, sulfuric acid, sulfamic acid, or the like.

In one aspect, a nickel/cobalt coating having MCrAlY particles and chromium carbide particles dispersed therein provides a coating having good oxidation resistance and tribological characteristics under high temperature operating conditions. While not being bound to any particular theory, under operating conditions, such as upon exposure to temperatures of from about 1000° F. to about 1600° F., an outer lubricious layer and an oxidation resistant layer are formed, the lubricious layer overlying the oxidation resistant layer. The outer, lubricious layer comprises cobalt oxide and chromium oxide that provide a lubricious glaze along the outer surface of the coating that decreases the coating wear rate. The oxidation resistant layer comprises aluminum oxide, and may also include yttrium oxide and/or chromium oxide that slow further oxidation of the coating. The outer, lubricious, cobalt oxide-rich layer is believed to slow the wear rate and prevent the underlying oxidation resistant, aluminum oxide rich layer from being worn away more quickly, thereby slowing further oxidation of the coating. The nickel also provides the coating with ductility, oxidation resistance, and hardness to prevent abrasive wear. Thus, the combination of a cobalt/nickel deposit and MCrAlY and chromium carbide particles dispersed in the deposit provide a coating that, under high temperature operating conditions, exhibit enhanced oxidation resistant and tribological characteristics.

A surface of a substrate or article may be provided with a coating comprising a metal matrix having MCrAlY particles dispersed therein using electrodeposition techniques. Electrodeposition systems generally include an anode and a cathode immersed in the electroplating bath. Typically, the substrate (i.e., the workpiece being plated) serves as the cathode. An electric current is passed through the anode and the plating bath, and the metal ions are reduced at the interface between the bath and the cathode, where the metal ions fall out of solution and are deposited onto the cathode. A suitable current is applied to the bath for a sufficient period of time to provide a coating of a desired thickness. In the system in accordance with the invention, MCrAlY particles are co-deposited with the metal and dispersed in the metal matrix layer formed on the substrate. In a bath that also includes chromium carbide particles, the chromium particles are also co-deposited and dispersed in the metal matrix.

The anodes may be selected based on the metal(s) being deposited or plated at the cathode. For example, the anodes typically include or may be formed from a metal that is being plated at the cathode. In the case of depositing a metal alloy, anodes of the separate metals being plated may be provided as bars, strips, or small chunks of metal in a titanium basket. The ratio of the separate metal areas may be adjusted to correspond to the desired metal ratio in the bath and/or deposited on the cathode. Alternatively, an alloy anode material may be used, and the alloy anode may have a metal ratio corresponding to the desired metal ratio in the bath and/or in the deposited coating. The anodes may be covered to reduce or prevent metal particles (of the metal being plated), anode slime, etc. from being introduced into the bath. The anodes may dissolve in the bath and the dissolved metal may be used to help replenish the metal(s) in the plating bath. The metal(s) in the plating bath may also be replenished via solution.

The electrodeposition system may be provided such that the bath is agitated during plating. This may serve several functions including insuring that the MCrAlY particles and other desired particles for codeposition do not settle in the bath but are circulated in the bath and moved toward the cathode. The bath may be mechanically and/or air agitated. Mechanical agitation may be accomplished by a separate mechanical agitator (e.g., a stirrer) and/or by mechanical movement of the article being plated. Air agitation may be accomplished by introducing air or an inert gas into the bath such as by bubbling in the air or gas through a hose.

Other operating conditions of the system may be selected as desired. For example, the bath may be heated to keep the components (other than the particles being codeposited) of the bath in solution and/or to increase the rate of deposition. With respect to a nickel/cobalt bath in accordance with embodiments of the present invention, the bath may be heated to a temperature of from about 110° F. to about 150° F., and in other embodiments form about 130° F. to about 140° F. For sulfamate based baths, it may be desirable for the bath to be operated at a temperature of about 110° F. to about 140° F. Plating may be carried out at a current density of, for example, about 20 amps/square foot (ASF) to about 50 ASF (about 20 $mA/cm^2$ to about 55 $mA/cm^2$).

The thickness of the coating layer may be provided as desired for a particular purpose or intended use. In one aspect, a coating formed from a bath in accordance with the present invention may have a thickness of from about 20 μm to about 130 μm (about 0.001 inches to about 0.005 inches).

The substrates onto which the metal deposits comprising MCrAlY particles may be applied are not particularly limited and may include metals such as, for example, nickel, cobalt, nickel alloys, steel, stainless steel, ferrous metals, copper, tin, copper alloys (including brass), zinc, and the like. Substrates for use in high temperature conditions may include nickel alloys (including nickel/cobalt substrates) and stainless steels. An example of suitable stainless steels include Inconel® stainless steels. Other examples of suitable substrates include alloy 718, Rene 41, Waspaloy, alloy X-750, Hastelloy®, and the like. The high temperature nickel/cobalt coating may be provided on parts and components used in high temperature environments including metallic components in aero engines, gas turbines, diesel engines, and the like. The coating may be deposited on metallic sealing rings used in such environments.

The substrate or article or surface thereof to be coated may be cleaned and/or pre-treated as may be desired. Substrates may be cleaned to remove oils, grease, dirt, etc., which may prevent adhesion of the coating in areas with such contaminants. Suitable methods for cleaning substrates include exposing the part or surface thereof to a solvent, a hot alkaline detergent, an acid, or the like. Cleaning may also be carried out by electrocleaning techniques.

An article may also be pre-treated by providing a strike or flash deposit on the article. The flash deposit may provide a surface that is acceptable in adherence to both the underlying substrate and the metal(s) being deposited in the coating of interest. The metal used for the flash coating may be chosen based on the material of the substrate and the metal(s) being deposited in the coating of interest. Examples of suitable metals for the flash coating include, for example, nickel or copper.

As previously described, under high temperature operating conditions, such as at temperatures of from about 1000° F. to about 1600° F., a nickel/cobalt coating with MCrAlY and chromium carbide particles dispersed therein may exhibit enhanced oxidation resistance and tribological characteristics. Such characteristics may be provided by the formation of an outer, cobalt rich lubricious layer overlying an (aluminum rich) oxidation resistant layer. In one aspect, articles comprising such a coating may be directly used in the desired environment, and such layers allowed to form in situ under operating conditions. In another aspect, articles comprising such a coating may be pretreated and exposed to a temperature of from about 1000° F. to about 1600° F. to form the lubricious outer layer and the underlying oxidation resistant layer.

Referring to FIG. 1, a substrate 10 having a coating 20 in accordance with aspects of the present invention is shown. The coating 20 is formed on a surface 12 of the substrate 10. The coating 20 includes a metal matrix 22 and MCrAlY particles 24 co-deposited with the metal(s) and dispersed in the metal matrix. As shown in FIG. 1, the deposit or coating also includes chromium carbide particles 26 dispersed in the metal matrix. In accordance with one aspect of the invention, the metal matrix 22 may be a nickel/cobalt alloy matrix having MCrAlY particles 24 and chromium carbide 26 particles dispersed therein.

Aspects of the invention may be further understood with reference to the following examples:

EXAMPLE 1

High-temperature Ni/Co Plating Bath

An aqueous plating bath for depositing a nickel/cobalt coating incorporating MCrAlY particles was prepared having the following composition:

12.6 g/L Cobalt (as metal), or 44 g/L Cobalt Sulfate 67 g/L Nickel (as metal), or 300 g/L Nickel Sulfate 38 g/L Boric Acid 115 g/L Chromium Carbide ($Cr_3C_2$) powder, 1.6 μm max particle size 50 g/L MCrAlY powder (Praxair CO-210-38 or equivalent), 2 μm±1 μm mean particle size, 5 μm max. particle size.

An elemental analysis of the MCrAlY particles showed the particles to have the following composition:

TABLE 1

Elemental Analysis of MCrAlY Powder (Praxair CO-210-38)

| Element | Concentration |
|---|---|
| Cobalt | Balance |
| Nickel | 32% ± 1% |
| Chromium | 21% ± 1% |
| Aluminum | 8% ± 1% |
| Yttrium | 0.5% ± 0.15% |
| Iron | 0.15% max |
| Phosphorus | 0.1% max |
| Sulfur | 0.1% max |
| Nitrogen | 0.03% max |
| Selenium | 0.005% max |
| All Others | 0.4% max |

Steel test panels are plated using the above solution. Separate nickel and cobalt bars are provided as the anodes in the system. The bath is heated to a temperature of from about 130° F. to about 140° F. and air agitated. Plating is carried out at a current density of 25 ASF to form a Ni/Co matrix having MCrAlY particles and chromium carbide particles dispersed in the matrix. The plating is carried out for a sufficient period of time to provide a coating having a thickness of about 125 μm.

COMPARATIVE EXAMPLE 1

Cobalt Plating Bath

An aqueous plating bath for depositing cobalt onto a substrate is provided having the following composition:

360 g/L Cobalt Sulfate (103 g/L as metal)

35-40 g/L Boric Acid 17 g/L Sodium Chloride 50-100 g/L Chromium Carbide pH: 2-3

The bath is heated to about 185° F. and agitated with a mechanical pump and steel test panels are plated at 25 ASF for a sufficient period of time to provide a coating with a thickness about 125 μm.

COMPARATIVE EXAMPLE 2

Nickel Plating Bath

An aqueous plating bath for depositing nickel onto a substrate is provided having the following composition:
- 430 g/L Nickel Sulfamate ($Ni(SO_3NH_2)_2 \cdot 4H_2O$); (96 g/L Ni as metal)
- 33 g/L Boric Acid
- 0.25% by volume Barrett SNAP AM wetting agent
- 120 g/L Chromium Carbide
- pH: 3.5-4.5

Steel panels are plated as follows: The bath is heated to a temperature of about 100 to about 130° F. and agitated with a mechanical pump. Steel panels are immersed in the bath and plated at 25 ASF for a sufficient period of time to provide a coating of about 125 µm.

Oxidation Testing

Panels plated with the baths of the above examples are tested for oxidation performance at high temperatures. The panels are exposed to air having a temperature of 1350° F. for 72 hours. The thickness of the oxide scale formed on the panels is determined. Results are shown in Table 2:

TABLE 2

| Oxidation Testing 1350° F. at 72 hrs in Air | |
|---|---|
| Coating | Scale Thickness |
| Example 1 | $5.8 \times 10^{-4}$ in |
| Comparative Example 1 | $1.9 \times 10^{-3}$ in |
| Comparative Example 2 | $3.5 \times 10^{-4}$ in |

As shown in Table 2, the coating in Example 1 exhibited better high temperature oxidation resistance than the cobalt coating with chromium carbide particles (Comparative Example 1) and comparable to the nickel coating with chromium carbide particles (Comparative Example 2). A nickel/cobalt coating with MCrAlY and chromium carbide particles is believed, however, to provide better wear resistance at high temperatures than the cobalt/chromium carbide coating and/or the nickel/chromium carbide coating. At service or testing temperatures, the nickel/cobalt coating with MCrAlY particles and chromium carbide particles is unexpectedly found to form a cobalt rich scale along the outer portion or surface of the coating and an aluminum rich oxide scale underlying the cobalt rich scale. Without being bound to any particular theory, the cobalt rich scale is believed to provide the coating with lubricity, which reduces the coefficient of friction between the coating and a counter face. This lubricious coating reduces wear of the coating, which prevents the underlying aluminum rich scale from wearing off. By delaying or preventing wear on the aluminum rich scale, greater oxidation resistance for the coating is expected under operating conditions as compared to nickel/chromium carbide coatings. That is, the tribo-oxidation performance of the nickel/cobalt coating with the MCrAlY particles and chromium carbide particles is enhanced relative to deposits with only nickel or cobalt that do not include the MCrAlY particles.

Although the invention has been shown and described with respect to certain embodiments, equivalent alterations and modifications may occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The claim invention is:

1. An article comprising an electroplated coating on a surface thereof, the electroplated coating comprising:
   - a matrix phase consisting of one selected from the group of a cobalt metal; a nickel/cobalt metal alloy, or a cobalt metal or a nickel/cobalt metal alloy alloyed with tin, zinc, copper, iron, tungsten, or a combination of two or more thereof;
   - MCrAlY particles dispersed in the matrix, wherein M is chosen from nickel, cobalt, iron, or a combination of two or more thereof; and
   - chromium carbide ($Cr_3C_2$) particles dispersed in the matrix, the chromium carbide ($Cr_3C_2$) particles having a particle size of about 1.6 µm or less,
   - wherein upon exposure to temperatures of from about 1000° F. to about 1600° F., the coating forms an outer, lubricious layer overlying an oxidation resistant layer, the lubricious layer comprising cobalt oxide and chromium oxide, and the oxidation resistant layer comprising aluminum oxide.

2. The article of claim 1, wherein the matrix phase consists of the nickel/cobalt metal alloy.

3. The article of claim 2, wherein the coating comprises from about 60 to about 80% by volume of the nickel/cobalt metal matrix.

4. The article of claim 3, wherein the nickel/cobalt matrix comprises from about 20% to about 80% nickel, and from about 20% to about 80% cobalt.

5. The article of claim 1, wherein the coating has a thickness of from about 25 µm to about 130 µm.

6. The article of claim 1, wherein the article is a metal seal.

7. The article of claim 1, wherein the coating comprises from about 10 to about 20% by volume of chromium carbide particles.

8. The article of claim 1, wherein the coating comprises from about 10 to about 20% by volume of MCrAlY particles.

9. An article comprising an electroplated coating on a surface thereof, the electroplated coating comprising:
   - a matrix phase comprising a metal alloy, wherein the matrix phase comprises nickel and cobalt;
   - MCrAlY particles dispersed in the matrix, wherein M is chosen from nickel, cobalt, iron, or a combination of two or more thereof; and
   - chromium carbide ($Cr_3C_2$) particles dispersed in the matrix,
   - wherein the coating comprises from about 60 to about 80% by volume of a nickel/cobalt metal matrix, from about 10 to about 20% by volume of MCrAlY particles, and from about 10 to about 20% by volume of chromium carbide particles, the nickel/cobalt matrix comprising from about 20% to about 80% nickel, and from about 20% to about 80% cobalt.

10. An article comprising an electroplated coating on a surface thereof, the electroplated coating comprising:
    - a matrix phase comprising a metal or a metal alloy, the metal or metal alloy comprising cobalt;
    - MCrAlY particles dispersed in the matrix, wherein M is chosen from nickel, cobalt, iron, or a combination of two or more thereof; and
    - chromium carbide ($Cr_3C_2$) particles dispersed in the matrix, the chromium carbide ($Cr_3C_2$) particles having a particle size of about 1.6 µm or less, wherein the coating comprises from about 10 to about 20% by volume of chromium carbide particles.

11. An article comprising an electroplated coating on a surface thereof, the electroplated coating comprising:
a matrix phase comprising a metal or a metal alloy, the metal or metal alloy comprising cobalt;
MCrAlY particles dispersed in the matrix, wherein M is chosen from nickel, cobalt, iron, or a combination of two or more thereof, and wherein the coating comprises from about 10 to about 20% by volume of MCrAlY particles; and
chromium carbide ($Cr_3C_2$) particles dispersed in the matrix, the chromium carbide ($Cr_3C_2$) particles having a particle size of about 1.6 μm or less.

* * * * *